Jan. 17, 1967 J. R. LUTHER 3,298,037

AUTOMATIC CONTROL FOR SCRUB SINK

Filed July 24, 1964

INVENTOR.
JOHN RANDOLPH LUTHER
BY
Charles L. Lovercheck
attorney

United States Patent Office 3,298,037
Patented Jan. 17, 1967

3,298,037
AUTOMATIC CONTROL FOR SCRUB SINK
John Randolph Luther, Erie, Pa., assignor to American Sterilizer Company, Erie, Pa., a corporation of Pennsylvania
Filed July 24, 1964, Ser. No. 384,843
1 Claim. (Cl. 4—166)

This invention relates to automatic water controls and more particularly to automatic controls for scrub sinks for use by doctors, nurses, and others to scrub and clean their hands in pre-surgery preparations.

Heretofore, scrub sinks used knee controls, foot pedals and elbow blades to actuate valves and to control the flow of water during the scrub period. It was also necessary to time the scrubbing visually. This introduced the possibility of error in that inadequate scrub time was frequently used.

Therefore, it is an object of this invention to provide a new and improved scrub sink which is completely automatic.

Still another object of the invention is to provide a scrub sink which may be automatically timed for a definite period and cannot be changed by unauthorized personnel.

A further object of the invention is to provide an automatic water temperature control which contains an automatic shut off if the cold water supply should fail, thus preventing scalding the user's hands by the hot water.

Another object of the invention is to provide a control to reset the scrub time if interrupted during the scrub procedure.

Other objects and advantages of this invention will become more apparent from the following detailed description taken in conjunction with the accompanying drawing, in which.

Figure 1:
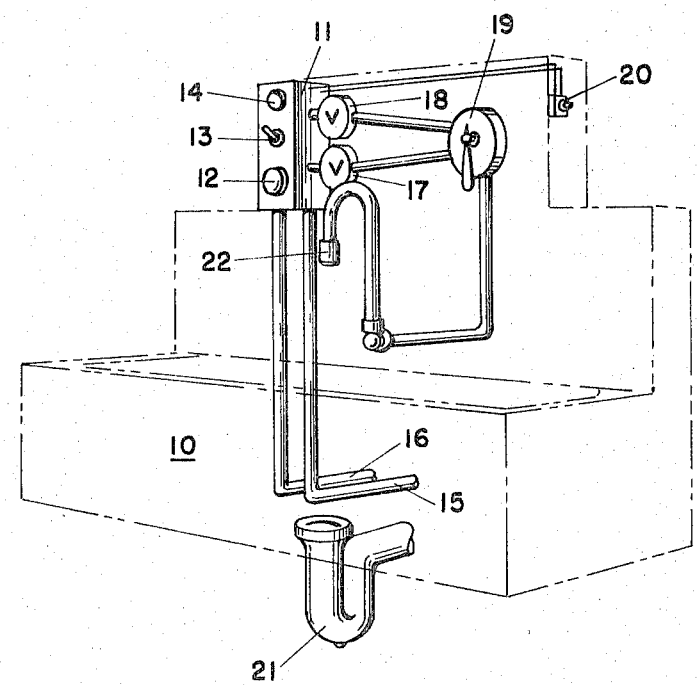
FIG. 1 is a schematic view of the controlling apparatus.
Figure 2:
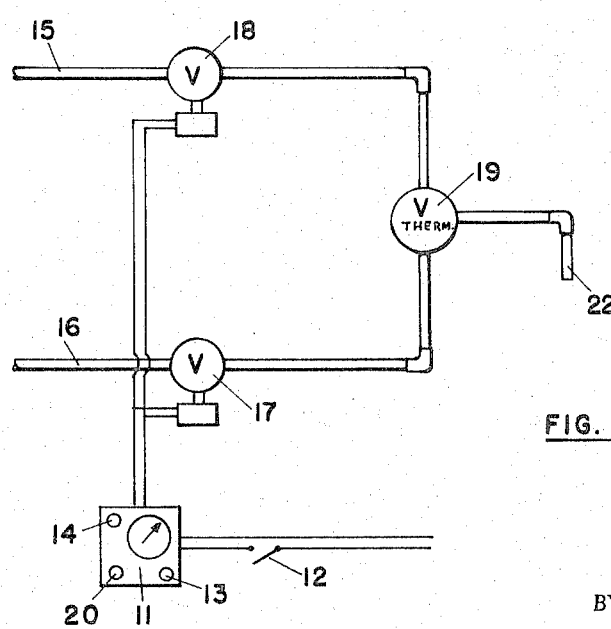
FIG. 2 is a schematic piping diagram of the sink according to the invention.

Referring now to the drawing, and particularly to FIGS. 1 and 2, a cold water inlet pipe 16 and hot water inlet pipe 15 are shown connected to an adjustable timer 11 which controls the scrubbing time accurately up to 15 minutes. To start the cycle, start button 12 must be pressed, located on the timer. The timer 11, which is connected to the hot and cold solenoid valves 17 and 18 turn the hot and cold water on and off, controls the flow of water through pipes to the temperature control mixing valve 19. The temperature of the water flowing therein is thermostatically controlled with a maximum temperature output of 115° F. for positive protection against burning hands of the user. The water then flows from temperature control unit or mixing valve 19 to the shower head 22. After use the water is eliminated through the waste drain 21 located directly under the shower head 22. A reset button 20 is provided which is connected to the timer. The reset button resets time cycle and is used in case of interruption during the scrub period. A short scrub switch 13 is also provided on timer 11 which actuates the timer to provide a shorter scrub period. A two minute warning light 14 flashes prior to the shutoff.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a sink and controlled water supply for cleaning the hands of hospital personnel comprising
  a sink,
  a shower head supported on said sink for dispensing water onto the hands of a person,
  a source of hot and cold water,
  a mixing valve connecting said hot and cold water to said shower head,
  said mixing valve having means therein for limiting the temperature of water flowing to said shower head to a predetermined temperature,
  a solenoid valve in said hot water line and a solenoid valve in said cold water line adapted to start and stop the flow of water through said valves to said mixing valve,
  a timer,
  said timer being connected to said solenoid valves,
  said timer having means thereon for actuating said solenoid valves selectively for a short scrub period and means for actuating said solenoid valves selectively for a long scrub period,
  and a warning light connected to said timer,
  said warning light having means connected thereto to actuate said warning light at a predetermined time prior to the end of a washing period.

References Cited by the Examiner
UNITED STATES PATENTS
2,492,913  12/1949  Bailey.
2,877,467   3/1959  Cloud.
2,970,321   2/1961  Rovell et al. _____ 4—187

LAVERNE D. GEIGER, *Primary Examiner.*
H. K. ARTIS, *Assistant Examiner.*